United States Patent [19]
Nyuu et al.

[11] Patent Number: 5,142,563
[45] Date of Patent: Aug. 25, 1992

[54] CORDLESS TELEPHONE SYSTEM WITH QUICK CHARGE MODE FOR RECHARGING BATTERY

[75] Inventors: Chikashi Nyuu, Dazaifu; Kiyoshi Hyakutake, Chikushi; Tetsuo Yamashita, Fukuoka, all of Japan

[73] Assignee: Matsushita Electric Industrial Co., Ltd., Osaka, Japan

[21] Appl. No.: 614,281

[22] Filed: Nov. 9, 1990

[30] Foreign Application Priority Data

Nov. 13, 1989 [JP] Japan .................. 1-294520

[51] Int. Cl.⁵ .......................... H04M 11/00
[52] U.S. Cl. ........................ 379/61; 379/58; 455/127; 455/343
[58] Field of Search ............ 379/58, 61, 63; 455/127, 343

[56] References Cited
U.S. PATENT DOCUMENTS
4,992,720 2/1991 Hata ........................ 379/61

FOREIGN PATENT DOCUMENTS
0326184 8/1989 European Pat. Off. ........ 379/61
0177647 7/1990 Japan ............................ 379/61

*Primary Examiner*—James L. Dwyer
*Assistant Examiner*—Dwayne D. Bost
*Attorney, Agent, or Firm*—Stevens, Davis, Miller & Mosher

[57] ABSTRACT

A cordless telephone includes a portable telephone and a base station. The portable telephone includes a voltage drop detecting circuit for detecting that a battery for supplying power to the circuit within the portable telephone is dropped in voltage to a predetermined value or less, and a control unit for controlling a transmission unit so that it transmits a voltage drop signal in accordance with an output from the voltage drop detecting circuit. When the voltage drop detecting circut detects the voltage-dropped state of the battery, a signal indicative of such state is sent to the base station.

5 Claims, 3 Drawing Sheets

CORDLESS TELEPHONE SYSTEM WITH QUICK CHARGE MODE FOR RECHARGING BATTERY

BACKGROUND OF THE INVENTION

The present invention relates to a cordless telephone.

Until now, a cordless telephone composed of a base station connected with a telephone line and a portable telephone communicating with it through wireless. This portable telephone is driven by a battery which can be charged by locating the portable telephone on the base station so that their charging terminals are brought into contact.

Now referring to the drawing, an example of the conventional telephones will be explained below.

FIG. 3 shows the arrangement of a charging part of the conventional cordless telephone. In the charging circuit on the side of a base station as shown in FIG. 3, 41 denote A.C. adapter input terminals to be connected to an A.C. adapter for a D.C. voltage having a predetermined magnitude from an A.C. power source; 42 denotes a constant-voltage circuit; 43 denotes a limiting resistor for limiting a charging current to a predetermined value; and 44 are charging terminals. In the charging circuit on the side of a portable telephone, 45 denotes charging terminals; 46 denotes a diode for preventing a backward current; and 47 denotes a chargeable battery (e.g. Ni-Cd battery) generally called a secondary battery. 48 and 50 denote resistors and 49 denotes a potentiometer-type resistor with a slidable tap; these resistors are connected in series. The voltage across the battery 47 is divided by these resistors and the resultant voltage appears at the tap of the resistor 49. 51 denotes a voltage drop detecting circuit to which the voltage appearing at the tap of the resistor 4 is supplied. 52 denotes control means which is a microcomputer. 54 denotes a light emitting diode (LED) for indicating a voltage drop; 53 is a transistor for driving the LED: and 55 denotes a resistor.

The operation of the cordless telephone thus constituted will be explained below. When a power supply voltage is applied to the A.C. adapter input terminal 41, a constant voltage is output from the constant voltage circuit 42; this constant voltage appears at the charging terminals 44. When the portable telephone is placed on the base station, the charging terminals 45 of the portable telephone are brought into contact with the charging terminals 44 of the base station so that a charging current flows into the battery 47 through the backward current preventing diode 46. Then, the value of the charging current is defined by that of the resistor 43.

In such a construction, the charging current is set for a very small value of about 10% of the battery capacity so that the possible longest life of the battery can be obtained. The charging by this current value is generally called normal charging.

If the voltage appearing at the tap of the resistor 49 becomes lower than the reference voltage set by the voltage drop detecting circuit 51 which the portable telephone is being used, the voltage drop detecting circuit 51 sends a signal to the control means. In response to input of this signal, the control means 52 send a signal to the transistor 53 to blink the LED 54, thus indicating that the voltage across the battery has been reduced.

Meanwhile, with only the normal charging, the charging current during the charging is so small that it takes a relatively long time to fully charge the battery. Therefore, some proposals has been made to implement quick charging. In such proposals, if a battery has been fallen into a voltage reduced state, means for detecting the voltage drop across a battery is used to charge the battery with a larger current larger than the normal current durig a predetermined period, thus completing the charging in a short time.

In the cordless telephone as mentioned above, a battery is provided on the side of a portable telephone whereas a charging circuit is provided on the side of a base station; therefore, charging the battery cannot be implemented unless the portable telephone is placed on the base station. Further, usually, if it is not recognized by the voltage drop detecting circuit that the voltage has been reduced to a value lower than a predetermined value, the above quick charging is not realized. This is because the charging with a large current in an insufficient discharged state may break the battery; only when it is recognized by the voltage drop detecting circuit that the battery has been sufficiently discharged, the quick charging is carried out. Such a construction, however, requires that another voltage drop detecting circuit is provided also on the side of the base station, thus leading to high cost.

SUMMARY OF THE INVENTION

An object of the present invention is to provide a cordless telephone which is constructed in a simple design and can surely carry out quick charging of a battery on the side of a portable telephone.

In accordance with the present invention, a portable telephone comprises a voltage drop detecting circuit for detecting the voltage-dropped state of a battery for supplying power to the circuit within the portable telephone and control means for controlling transmission means so that it transmits a voltage drop signal in accordance with the output from the voltage drop detecting circuit; and a base station comprises means for detecting that the portable telephone has been placed on the base station and current supply means for supplying a charging current to the battery in the portable telephone, the current supply means being designed so that it can be switched over between a normal charging mode and a quick charging mode in terms of the charging current wherein when a voltage drop signal is sent from the portable telephone, storage means stores the information indicative of that the voltage has been dropped and when it is detected in this state that the portable telephone has been placed on the base station, the current supply means is switched into the quick charging mode. Thus, when the voltage drop of the battery in the portable telephone is detected, a signal indicative of this fact is previously sent from the portable telephone to the base station before the portable telephone is placed on the base station so that this fact can be stored on the side of the base station. Therefore, if the portable telephone in the voltage dropped state is placed on the base station, the base station can automatically start the quick charging and so this can be carried out even if the no voltage drop detecting circuit is provided on the side of the base station. Accordingly, in placing the portable telephone on the base station, a user is not required to perform an operation of detecting the start of the quick charging, thus providing greatly improved handling easiness. Further, the voltage drop detecting circuit provided in the portable telephone can be efficiently used so that the cordless telephone can be realized with a small number of components.

DESCRIPTION OF THE PREFERRED EMBODIMENT

Figure 1:
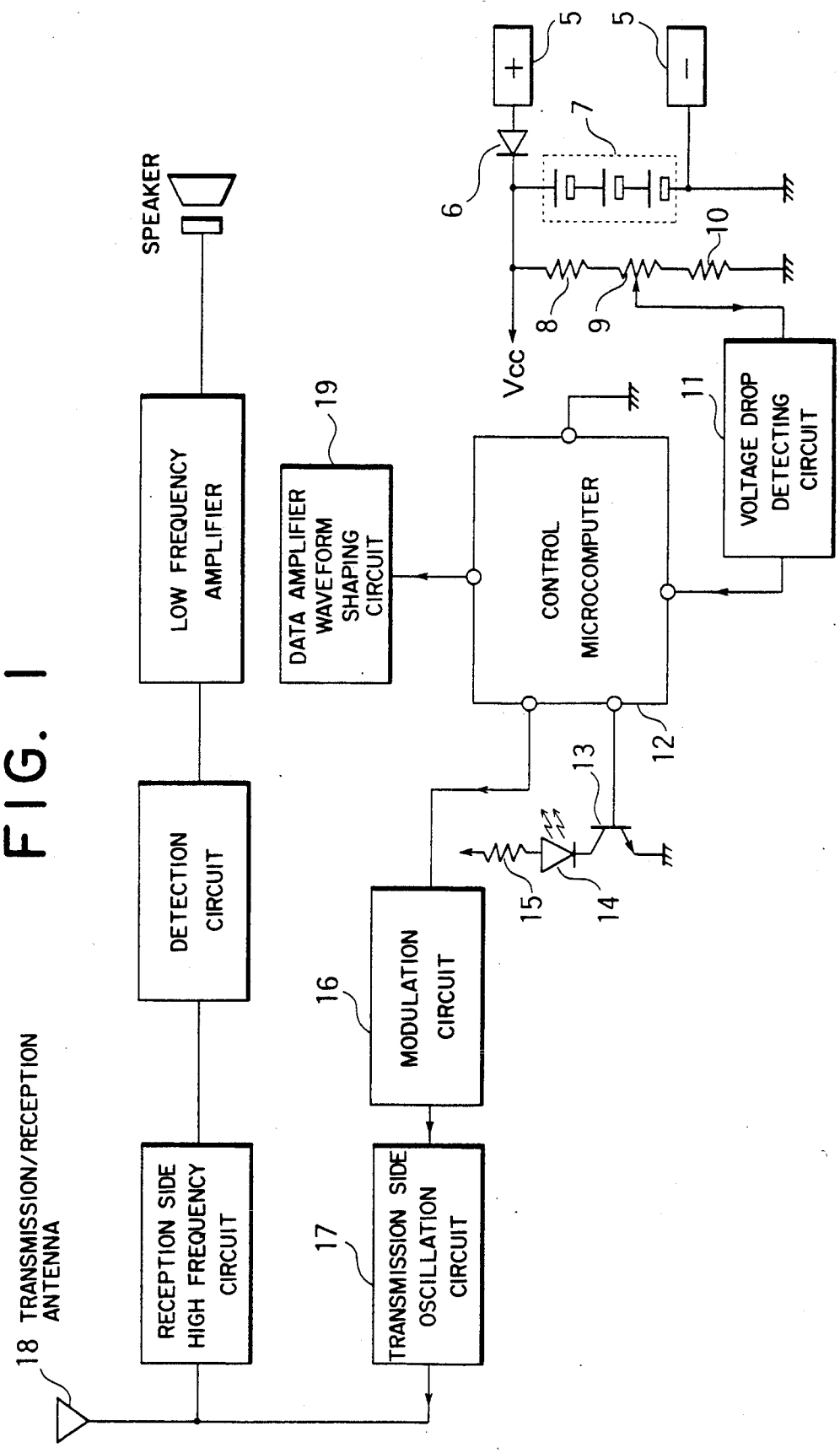
FIG. 1 is a block diagram showing the arrangement of the portable telephone of a cordless telephone according to an embodiment of the present invention.

Referring to the drawings, one embodiment of the present invention will be explained below.

Figure 2:
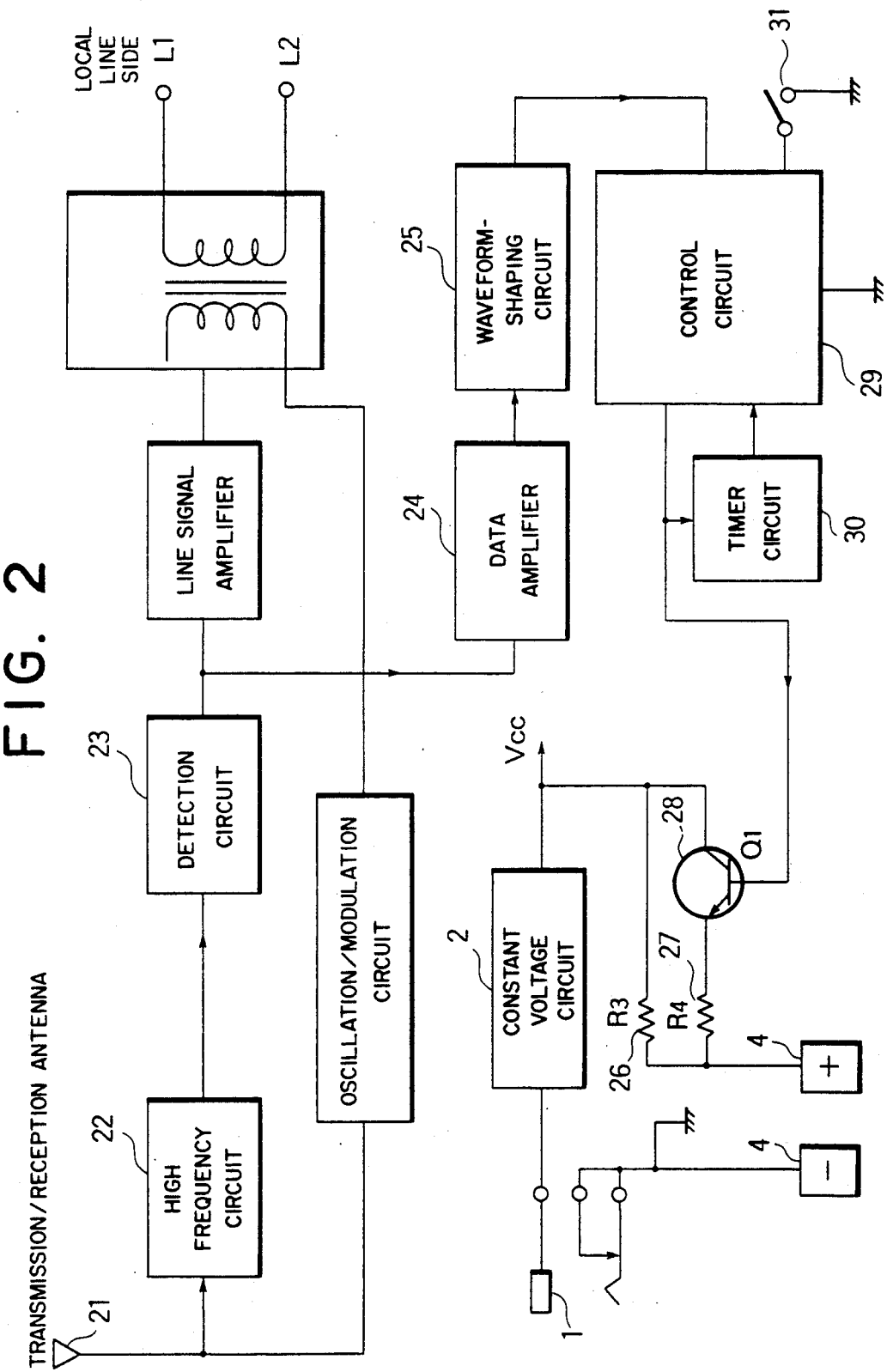
Fig. 2 is a block diagram showing the arrangement of the base station of the same cordless telephone.
Figure 3:
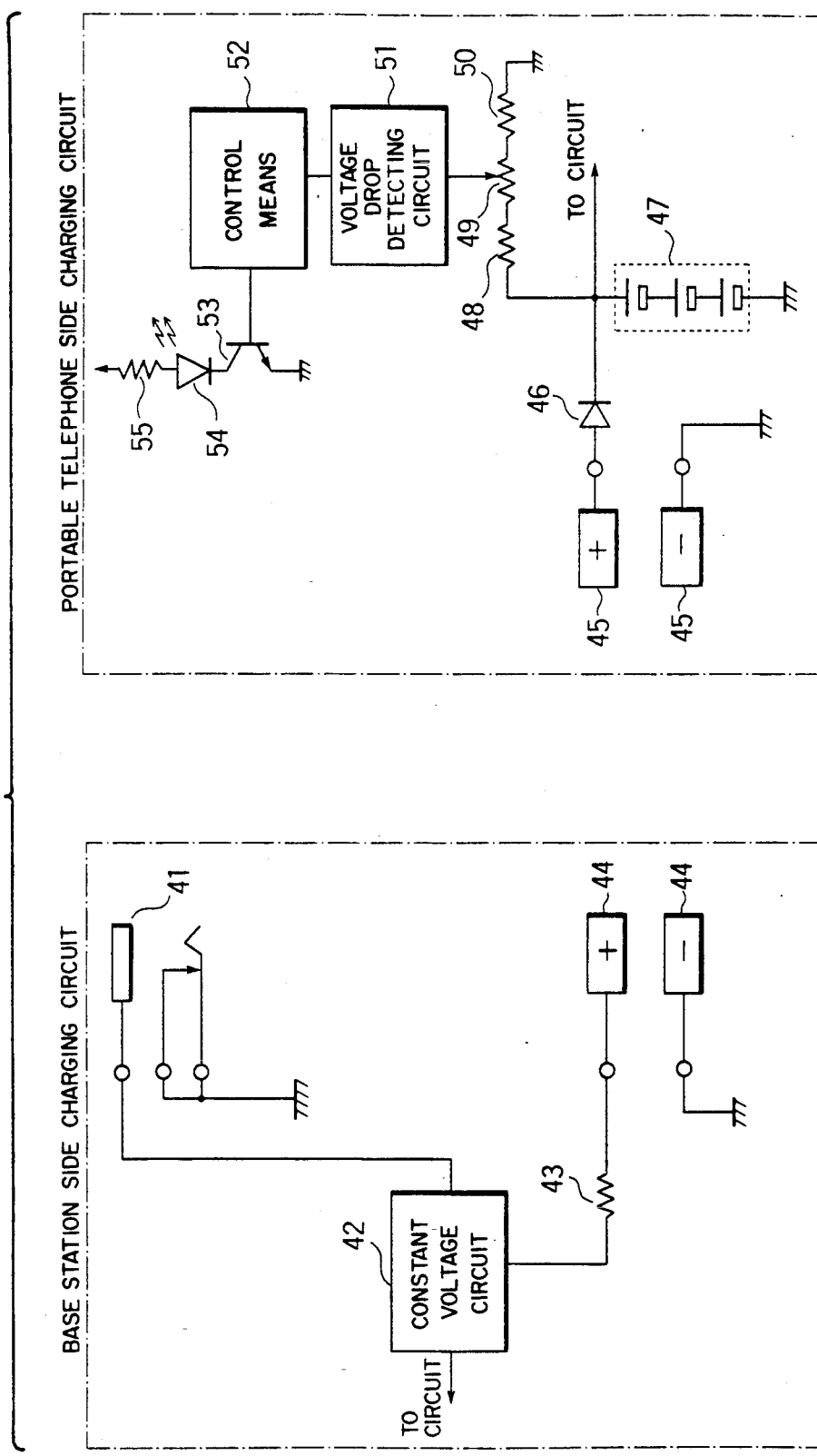
FIG. 3 is a circuit diagram showing the charging part of the conventional cordless telephone.

FIG. 1 is a block diagram showing the arrangement of the portable telephone of a cordless telephone according to an embodiment of the present invention. FIG. 2 is a block diagram showing the arrangement of the base station of the same cordless telephone. In FIG. 1, 5 denote charging terminals; 6 denotes a diode for preventing a backward current; and 7 denotes a chargeable battery. 8 and 10 denote resistors and 9 denotes a potentiometer-type resistor with a slidable tap; these resistors are connected in series. The voltage across the battery 7 is divided by these resistors and the resultant voltage appears at the tap of the resistor 9, 11 denotes a voltage drop detecting circuit to which the voltage appearing at the tap of the resistor 9 is supplied. 12 denotes control means which is a microcomputer. 14 denotes a light emitting diode (LED) for indicating a voltage drop; 13 denotes a transistor for driving the LED; 16 denotes a modulation circuit; 17 denotes an oscillation circuit; and 18 denotes an antenna.

In FIG. 2, 21 denotes an antenna; 22 denotes a high frequency circuit; 23 denotes a detection circuit; 24 denotes a data amplifier for amplifying a data signal; and 25 denotes a waveform shaping circuit for shaping the waveform of the data signal. 1 denotes an A.C. adapter circuit input circuit to be connected with an A.C. adapter; 2 denotes a constant voltage circuit; and 4 denotes charging terminals. 26 and 27 denotes resistors for limiting the charging current; and 28 denotes a transistor for switching over normal charging into quick charging and vice versa. The resistance R3 of the resistor 26 and the resistance R4 of the resistor 27 are in such a relation as R3 > R4 so that when the transistor turns on, a large current flows through the resistor 27. 29 is control means which is a microcomputer; 30 is a timer circuit; and 31 is a switch for detecting that the portable telephone has been placed on the base station.

The operation of the cordless telephone thus constructed will be explained below.

When the battery 7 is fallen into the voltage dropped state owing to use of the portable telephone, the voltage drop detecting circuit 11 detects it to send the information to the control means 12. Then, the control means 12 supplies an operation signal to the transistor 13 to blink the LED 14 so as to indicate that the battery 7 has been fallen into the voltage dropped state. At the same time, the control means 12 sends to the modulation circuit 16 a data signal indicative of that the battery 7 has been fallen into the voltage dropped state; the modulated data signal is sent in the form of a radio wave to the base station through the oscillation circuit 17.

This radio wave is received by the base station through the antenna 21 and the high frequency circuit 22. The data signal indicating that the portable battery is in the voltage dropped state is extracted by the detection circuit 23. The data signal thus extracted is sent to data amplifier 24. The data signal amplified by the data amplified 24 is waveform-shaped by the waveform shaping circuit 25. The data signal waveform-shaped is sent to the control means 29 and stored in the storage means provided therein.

If the portable telephone is placed on the base station in this state, the switch 31 turns on. Then, the control means 29 starts the timer circuit 30 and also sends a signal of "Hi" to the transistor 28 to turn it on. When the transistor 28 turns on, a charging current flows into the battery 7 of the portable telephone through the resistor 27. Thus, the resultant charging current in this state is the sum of the currents flowing through the resistor 26 and the resistor 27. The quick charging due to such a large current is carried out. When a predetermined time set by the time circuit 30 elapses, the timer circuit 30 sends a signal to the control means 29. Then, the control signal 29 sends a signal of "Low" to the transistor 28 to turn it off. When the transistor 28 turns off, the charging current supplied to the battery of the portable telephone becomes only the small current flowing through the resistor 26. This means that the quick charging has been switched into the normal charging. In accordance with this switching, the data, indicating that the portable telephone is in the voltage dropped state, stored in the storage means provided in the control means 29 will be cancelled.

Additionally, although in this embodiment, the fact that the portable telephone has been placed on the base station is detected by a mechanical switch, it may be detected by detecting the current flowing through the resistor 26 during charging; otherwise, a Hall element or a magnetic switch may be used.

We claim:

1. A cordless telephone composed of a base station connected with a telephone line and a portable telephone communicating with the base station through wireless, wherein said portable telephone comprises:

a chargeable battery for supplying power to circuit components;

a voltage drop detecting circuit for detecting that said battery has been fallen into a voltage dropped state; and control means for transmitting a signal indicative of the voltage drop to said base station through wireless in accordance with the output from said voltage drop detecting circuit.

2. A cordless telephone according to claim 1, further comprising display means for visually display the output from said voltage drop detecting circuit.

3. A cordless telephone composed of a base station connected with a telephone line and a portable telephone communicating with the base station through wireless, wherein said portable telephone comprises:

a chargeable battery for supplying power to circuit components;

a voltage drop detecting circuit for detecting that said battery has been fallen into a voltage dropped state; and control means for transmitting a signal indicative of the voltage drop to said base station through wireless in accordance with the output from said voltage drop detecting circuit; and said base station comprises:

current supply means for supplying a charging current to the battery in the portable telephone, the current supply means being designed so that it can be switched over between a normal charging mode and a quick charging mode in terms of the charging current; and control means for, when receiving a signal indicative of the voltage dropped state sent from said portable telephone, switching said current supply means into the quick charging mode to perform a charging operation.

4. A cordless telephone according to claim 3, further comprising a timer for maintaining the current supply means in the quick charging mode for a predetermined time.

5. A cordless telephone composed of a base station connected with a telephone line and a portable telephone communicating with the base station through wireless, wherein said portable telephone and said base station comprise charging terminals which are brought into contact with each other when said portable telephone is placed on the base station, thereby permitting a charging current to be supplied from said base station to said portable telephone;

said portable telephone further comprise:
a chargeable battery for supplying power to circuit components;

a voltage drop detecting circuit for detecting that said battery has been fallen into a voltage dropped state; and control means for transmitting a signal indicative of the voltage drop to said base station through wireless in accordance with the output from said voltage drop detecting circuit; and said base station comprises:

detection means for detecting that said portable telephone has been placed on the base station;

current supply means for supplying a charging current to the battery in the portable telephone, the current supply means being designed so that it can be switched over between a normal charging mode and a quick charging mode in terms of the charging current; and received signal processing means for, when receiving a signal indicative of the voltage dropped state sent from said portable telephone, storing the information relative thereto in storage means;

control means for switching said current supply means into the quick charging mode to perform a charging operation when said detection circuit generates a detection signal in the state where the information indicative of the voltage dropped state is stored in said storage means.

* * * * *